United States Patent
Hillier et al.

(10) Patent No.: US 9,237,229 B2
(45) Date of Patent: Jan. 12, 2016

(54) CALL AUTHORIZATION FEATURE

(75) Inventors: Peter Matthew Hillier, Ottawa (CA); Katayoun Hillier, Ottawa (CA)

(73) Assignee: Mitel Networks Corporation, Ottawa, Ontario (CA)

(*) Notice: Subject to any disclaimer, the term of this patent is extended or adjusted under 35 U.S.C. 154(b) by 449 days.

(21) Appl. No.: 12/925,919

(22) Filed: Nov. 1, 2010

(65) Prior Publication Data

US 2012/0106720 A1    May 3, 2012

(51) Int. Cl.
| | |
|---|---|
| *H04M 11/00* | (2006.01) |
| *H04M 3/436* | (2006.01) |
| *H04M 3/54* | (2006.01) |
| *H04M 3/42* | (2006.01) |
| *H04M 3/51* | (2006.01) |

(52) U.S. Cl.
CPC .......... *H04M 3/436* (2013.01); *H04M 3/42212* (2013.01); *H04M 3/548* (2013.01); *H04M 3/42153* (2013.01); *H04M 3/5108* (2013.01); *H04M 2203/2011* (2013.01)

(58) Field of Classification Search
USPC ............................................. 379/188, 201.01
See application file for complete search history.

(56) References Cited

U.S. PATENT DOCUMENTS

| | | | |
|---|---|---|---|
| 6,148,074 A | 11/2000 | Miloslavsky | |
| 7,092,500 B2 * | 8/2006 | Creamer et al. | 379/102.01 |
| 7,133,510 B1 * | 11/2006 | Freeman et al. | 379/188 |
| 8,218,753 B2 * | 7/2012 | Khouri et al. | 379/265.01 |
| 2003/0123634 A1 | 7/2003 | Chee et al. | |
| 2006/0217133 A1 * | 9/2006 | Christenson et al. | 455/461 |
| 2008/0118046 A1 * | 5/2008 | Katkam et al. | 379/198 |
| 2009/0046841 A1 * | 2/2009 | Hodge | 379/189 |
| 2012/0099716 A1 * | 4/2012 | Rae et al. | 379/114.2 |

FOREIGN PATENT DOCUMENTS

| | | |
|---|---|---|
| EP | 1345397 A1 | 9/2003 |
| EP | 1453283 A1 | 9/2004 |

* cited by examiner

*Primary Examiner* — Curtis Kuntz
*Assistant Examiner* — Maria El-Zoobi

(57) ABSTRACT

A call processing method, system and communication device for providing call authorization features. Generally described, the present application relates to authorizing communications between devices during call setup time. In one illustrative embodiment, communications within a telephone network configured within a private branch exchange or carrier are filtered using an authorizing device. The authorizing device can be activated using different procedures including, but not limited to, feature access codes and pin numbers. When a call is received from a calling device, the telephone network can reserve a line for the call to the intended restricted device. The authorizing device can thereafter be alerted about the call. A user of the authorizing device can answer the call or direct the telephone network to block the call, connect the call with the restricted device through the reserved line, or forward the call to a third device.

15 Claims, 7 Drawing Sheets

CALL AUTHORIZATION FEATURE

TECHNICAL FIELD

This application generally relates to communication networks, and more particularly, to call routing decisions made by an authorizing device during call setup time to block, authorize, answer or redirect a call.

BACKGROUND

A telephone system, in its most basic form, includes one individual dialing a telephone number assigned to another individual. With such a system, there is a one-to-one relationship between the dialed number and the destination. Time, however, has increased the sophistication of these systems as well as the relationships between a caller and the individual to be called. As an added complexity, the number of devices associated with any individual is no longer limited to one device.

Call routing services provided within many telephone systems allow these devices to be interconnected. Call routing systems have nevertheless resulted in unintended consequences. When a user forwards their calls from their home to a cell phone, for example, calls can be erroneously forwarded even though some calls were intended for their home. Call routing decisions in routing systems are handled by static routing tables in a carrier or private branch exchange. U.S. Pat. No. 6,148,074 to Miloslaysky et al. has been devised to update these routing tables using computer telephony integration controls. Other solutions use presence based concepts, such as an agent login, to update routing tables. These solutions are persistent, and the changes to the routing table remain fixed until a similar event occurs to cause the route to be removed or updated.

The most basic example of call routing decisions would be Call Forward Always which provides a private branch exchange or public switched telephone network extension with the ability to forward calls to another destination device. A problem arises, however, when the destination device again forwards the number back to the original phone. Because this is blocked in private branch exchanges and carrier environments as it is considered a forwarding loop, it simply cannot be done. A console attendant can be placed in the middle and tasked with answering and redirecting calls. In this scenario, calls are billed as soon as they are answered.

As a result, there is a need for providing call features that overcome the challenges provided above. The present application addresses these issues encountered in a call routing system and provides other, related advantages.

DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Generally described, the present application relates to authorizing communications between devices during call setup time. In one illustrative embodiment, communications within a telephone network configured within a private branch exchange (PBX) or carrier are filtered using an authorizing device. The authorizing device can be activated using different procedures including, but not limited to, feature access codes and pin numbers. When a call is received from a calling device, the authorizing device can be alerted about the call. A user of the authorizing device can answer the call or direct the telephone network to block the call, connect the call with the restricted device, or forward the call to a third device.

Numerous advantages can be provided by the illustrative embodiment described above. The user of the authorizing device can act as a real-time call routing agent for one or more of their peers. Calls can be reviewed, approved, and connected to a destination based on an individual's given criteria, and not necessarily on fixed or premeditated route programming. Since this is done during call setup, typically no toll costs are incurred.

While the terms "restricted device", "authorizing device" and "calling device" are referred throughout the present application, other names known to those skilled in the relevant art can be used. A "restricted device" can refer, but is not necessarily limited to, an apparatus that typically does not receive calls unless approved. "Authorizing devices" can refer to an apparatus that approves or rejects the calls to the restricted device and a "calling device" can refer to an apparatus attempting to contact the restricted device. Variations to the provided illustrative embodiment are described herein and will become apparent to those skilled in the relevant art. Below an exemplary operating environment for call authorization features will be described. Flow charts showing illustrative processes for activating the authorizing device along with call handling procedures will thereafter be described.

Figure 1:
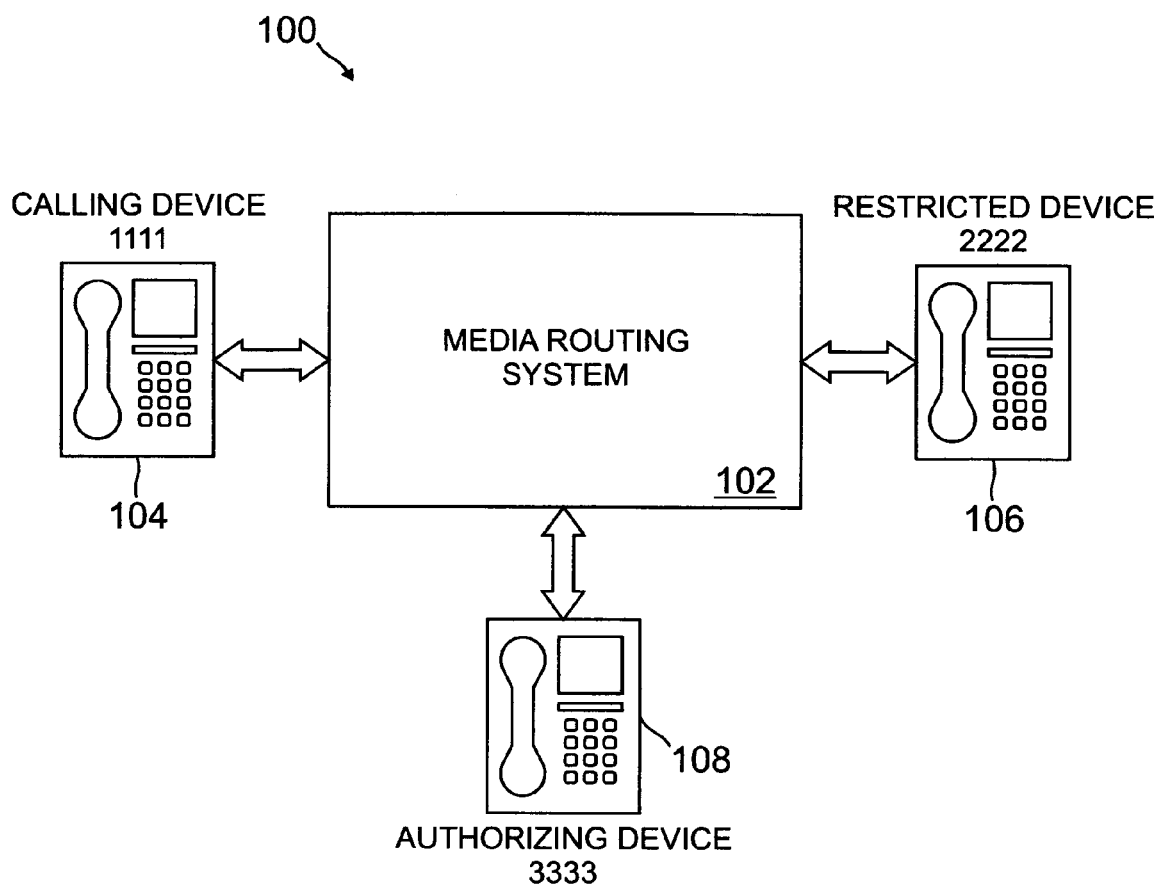
FIG. 1 is a typical environment for implementing a call authorization feature in accordance with one aspect of the present application.

Referring to FIG. 1, a typical environment 100 for implementing a call authorization feature in accordance with one aspect of the present application is provided. The environment 100 can include a media routing system 102, calling device 104, restricted device 106 and authorizing device 108 configuration as shown. These components should not be construed as limiting the scope of the present application, but instead, the components should be viewed as only one environment 100 for providing call authorization features.

Components within the environment 100 can communicate with each other using logical connections standard within any telephone network. These logical connections can be achieved by a communication portal coupled to or integral with each component. The media routing system 102 can operate on a PBX or other carrier such as a public switched telephone network (PSTN). Known in the relevant art, PBXs 102 can incorporate a system memory and a system bus that operatively couples various system components, including the system memory to a processing unit. There can be only one or there can be more than one processing unit, such that the processor of the PBX 102 can include a single central processing unit, or a plurality of processing units, commonly referred to as a parallel processing environment. Disk drives and their associated computer-readable medium can provide nonvolatile storage of computer-readable instructions, data structures, program modules, and other data. It should be appreciated by those skilled in the relevant art that any type of computer-readable medium that can store data that is accessible by a computer, for example, magnetic cassettes, flash memory cards, digital video disks, RAM, and ROM, can be used in the exemplary PBX 102.

Coupled to the media routing system 102 are the calling device 104, restricted device 106 and authorizing device 108. In one embodiment, these devices 104, 106 and 108 can be a mobile phone, smart phone, IP phone, or other electronic device. While only one calling device 104, restricted device 106 and authorizing device 108 are shown in FIG. 1, it should be understood that the environment 100 can incorporate only one or many of each device 104, 106 and 108. For example, one authorizing device 108 can be used to monitor communications to three restricted devices 106.

Generally, each device 104, 106 and 108 can include a processor for implementing logic, a memory, a display, and a keypad. The devices 104, 106 and 108 can include an operating system, such as Windows® CE or Windows Mobile® available from Microsoft Corporation, Redmond, Wash., or other OS. One or more application programs can be loaded into memory and run on or in association with the operating system. Menus can be provided that allow for call handling selections. For purposes of illustration, which will become more apparent from the discussion below, each of the devices 104, 106 and 108 can be associated with an extension. In one illustration, the extension can be four-digit codes assigned to an employee within an organization. For example, the calling device 104 can have an extension of 1111, the restricted device 106 can have an extension of 2222 and the authorizing device 108 can have an extension of 3333. In one embodiment, more or less than four digits can be used to identify the device.

While the call authorization feature will be discussed in relation to the media routing system 102, it can also be implemented outside of the system 102. For example, an application can be present on the restricted device 106 that can forward calls to the authorizing device 108, whereby the authorizing device 108 can approve the call and send it back to restricted device 106.

Figure 2A:
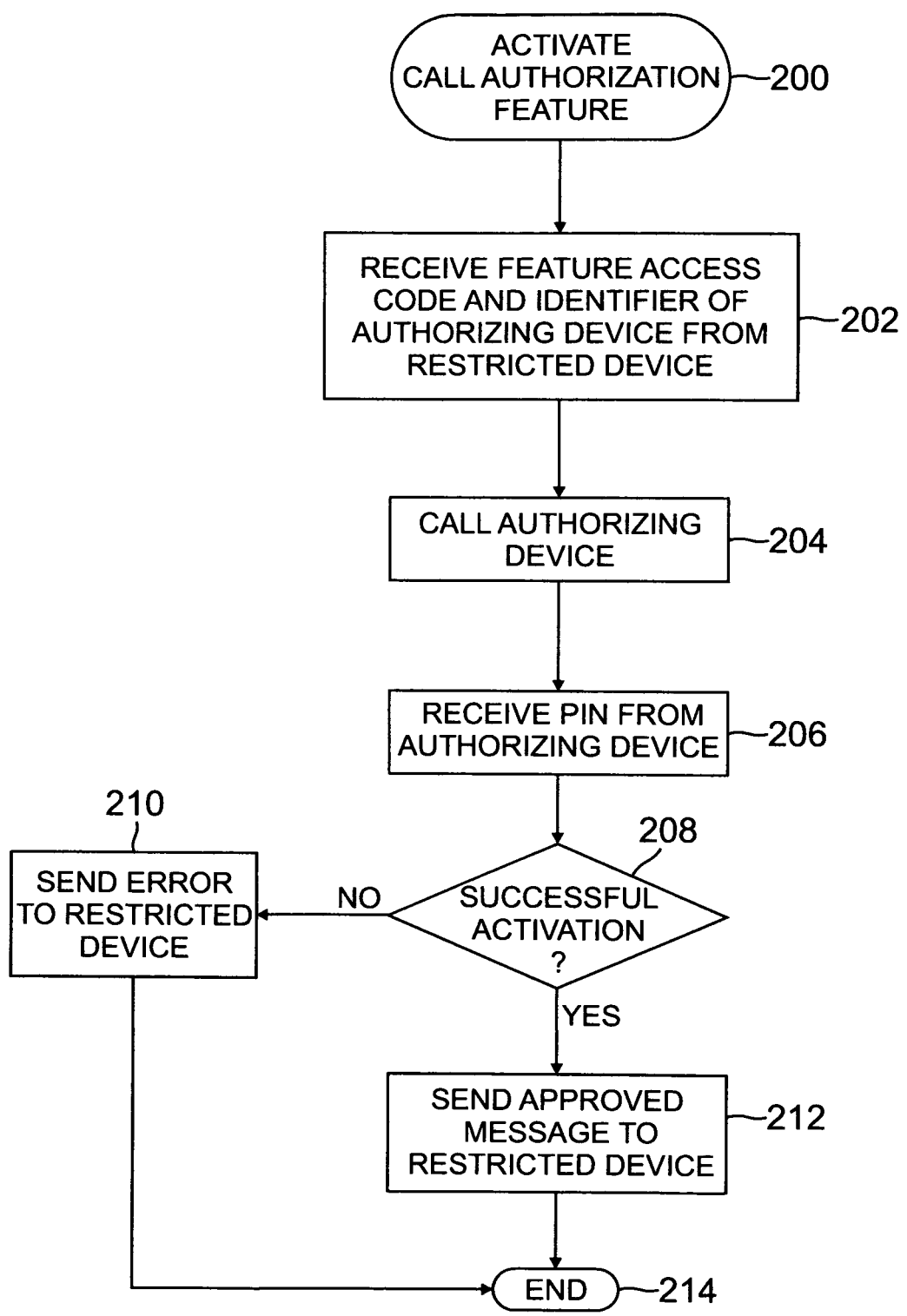
FIGS. 2A and 2B are illustrative flow charts for activating the call authorization feature in accordance with one aspect of the present application.
Figure 2B:
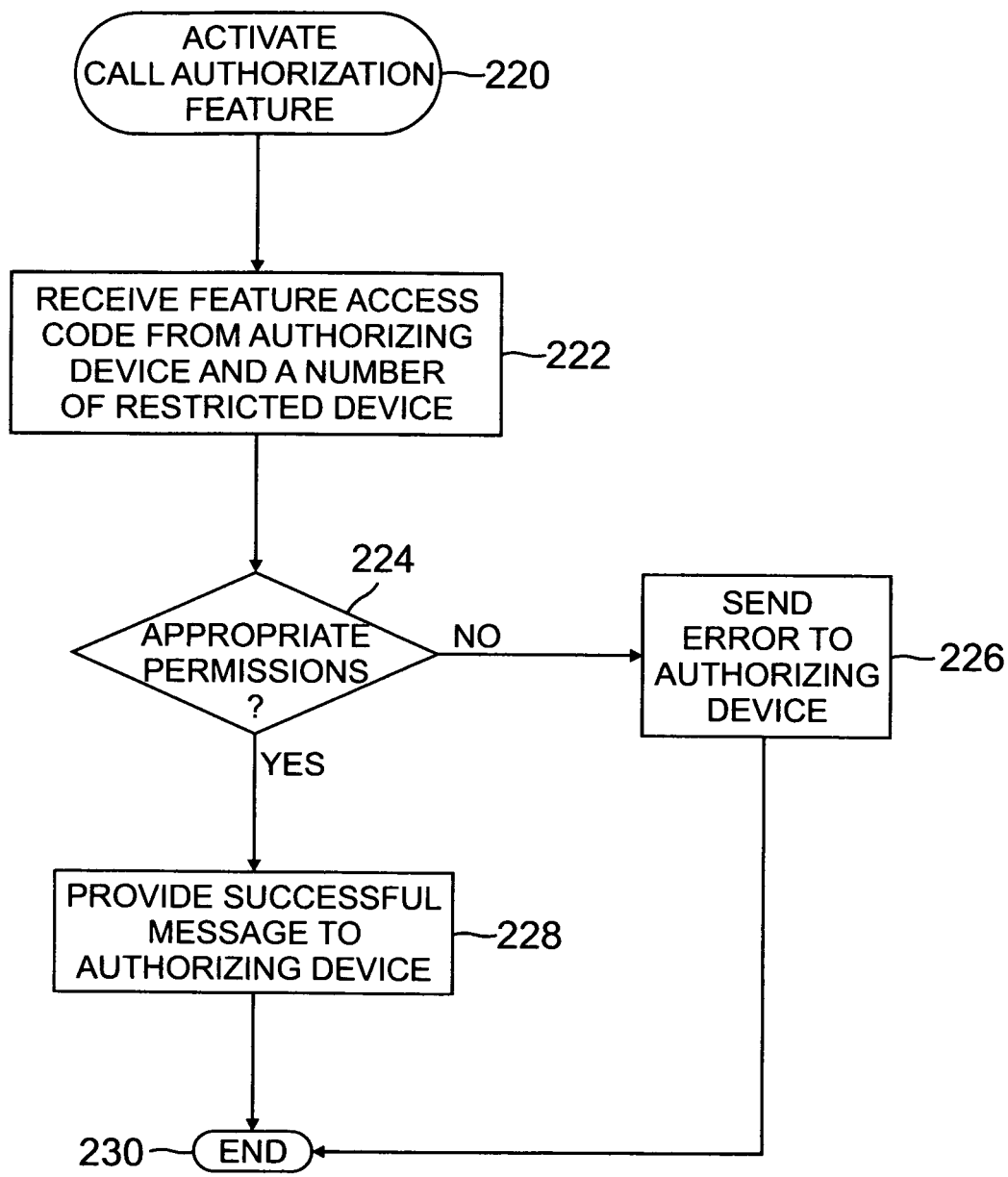

Flow charts diagramming procedures for activating call authorization features will now be disclosed. FIG. 2A depicts processes for activating the call authorization feature by the restricted device 106, while FIG. 2B shows activation by the authorizing device 108. As will become apparent, the processes are typically performed by the media routing system 102. Nevertheless, the processes can be performed outside of the media routing system 102, implementations which are known in the relevant art. It is intended that the flow charts provide a general understanding of process that can be used, but are not necessary.

In FIG. 2A, the processes for activating a call authorization feature by the restricted device 106 begin at block 200. For each restricted device 106 requiring activation, the same processes described below can be performed. The user of the restricted device 106 begins activation by lifting their handset and calling the media routing system 102. At block 202, the media routing system 102 can receive a feature access code from the restricted device 106. The feature access code can be used to identify to the media routing system 102 that the restricted device 106 intends to be activated. For example, when the user of the restricted device 106 dials the feature access code of 1234, the media routing system 102 can determine that the user intends to active the authorization feature. An identifier for an authorizing device 108 can be also provided by the restricted device at block 202. More than one authorizing device 108 can be used to filter communications to the restricted device 106. Continuing with the illustration provided above, the restricted device 106 can provide the identifier 3333 to the media routing system 102 to indicate its intention to activate the call authorization feature by the authoring device 108.

In one embodiment, and optionally, the media routing system 102 can call the authorizing device 108 to determine whether the authorizing device 108 has appropriate permissions to control communications to the restricted device 106 at block 204. The media routing system 102 can use the identifier provided earlier by the restricted device 106 to make this determination. A lookup table can also be used that details permissible connections. In one embodiment, and as shown in FIG. 2A, the media routing system 102 can activate the call authorization feature by requesting a pin from the user of the authorizing device 108. The system 102 can receive the pin from the authorizing device 108 at block 206.

At decision block 208, a determination can be made by the media routing system 102 whether the authorizing device 108 was successfully activated. An error is provided to the restricted device 106 at block 210 when the authorizing device 108 could not be successfully activated. When successful, however, at block 212, the media routing system 102 can send an approved message to the restricted device 106 confirming that the authorizing device 108 is now activated. The activation processes can end at block 214.

Turning now to FIG. 2B, and beginning at block 220, the processes for activating the call authorization feature using an authorizing device 108 are shown. Different from before, the authorizing device 108 performs the activation instead of the restricted device 106. The processes can begin with a user of the authorizing device 108 calling the media routing system 102. At block 222, the media routing system 102 can receive a feature access code from the authorizing device 108 along with a number of a restricted device 106. The feature access code can instruct the media routing system 102 that an authorizing device 108 is intending to filter calls at the restricted device 106. Continuing with the previous illustration, the number provided by the authorizing device 108 can be 2222.

At decision block 224, a program can be consulted to determine whether the authorizing device 108 has appropriate permissions to restrict calls at the restricted device 106. Known to those skilled in the relevant art, there are a number of different ways to determine whether the authoring device 108 has appropriate permissions, for example, if the restricted device 106 has the same billing account as the authorizing device 108. When the appropriate permission are not provided at block 226, the media routing system 102 can send an error message to the authorizing device 108 that calls cannot be restricted. Otherwise, the media routing system 102 can provide a successful message to the authorizing device 108 indicating that the authorizing device 108 can now restrict communications to the restricted device's 106 at block 228. The activation processes can end at block 230.

While numerous processes were provided in FIGS. 2A and 2B for activating the authorizing device 108 and restricted device 106, those skilled in the relevant art will appreciate that other processes can be used. For example, provisioning can be used to configure the authorizing device 108 and restricted devices 106. In some cases, default policies can be applied if the authorizing device 108 is busy or does not answer the call. If calls are blocked, policies can be used to determine if the call goes to voicemail or gets a reorder tone.

Figure 3A:
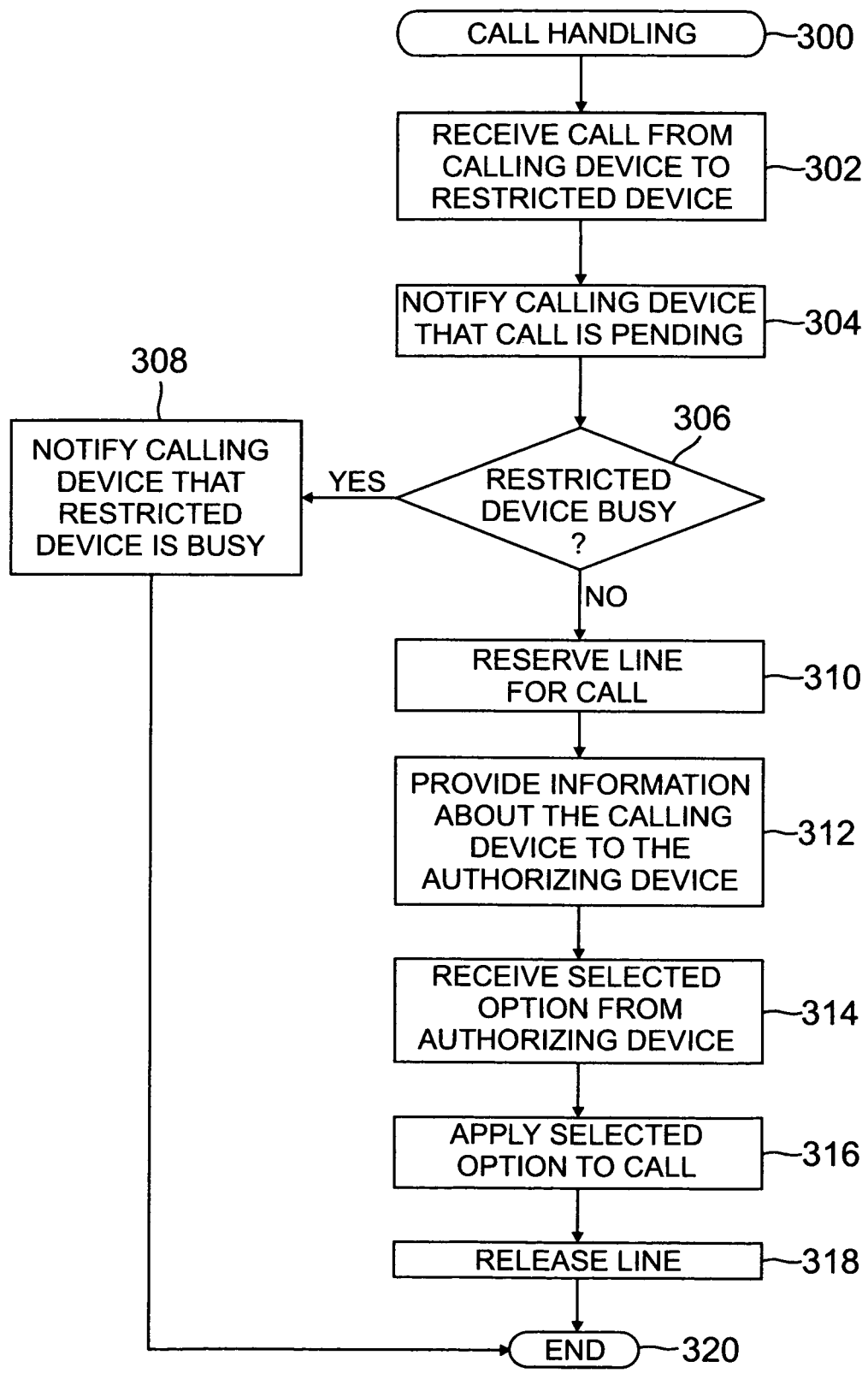
FIGS. 3A, 3B, 3C and 3D represent exemplary call handling procedures in accordance with one aspect of the present application.

Turning now to FIG. 3A, a flow chart for call handling processes in accordance with one embodiment of the present application is provided. The processes described herein represent one embodiment and should not be construed as limiting to the present application. Fewer or more processes can be used known to those skilled in the relevant art. The processes can begin at block 300. At block 302, the media routing system 102 can receive a call from the calling device 104 to the restricted device 106. In turn, the media routing system 102 intercepts the call before it reaches the restricted device 106. In one embodiment, not shown, the media routing system 102 can determine whether the calling device 104 has been preauthorized. A preauthorized list can be maintained on the media routing system 102. When the calling device 104 is preauthorized, the media routing system 102 can direct the call to the restricted device 106 without the authorizing device's 108 approval.

At block 304, the user of the calling device 104 can be notified that the call is pending authorization. In one embodiment, this can be transparent to the caller. Before placing a call to the authorizing device 108, the restricted device 106 can be checked whether it is busy or available at decision block 306. Generally, the restricted device 106 is busy when the device 106 is on a call, shut down, etc. If the device 106 is busy, in one embodiment, the media routing system 102 can notify the calling device 104 at block 308. The processes can end at block 320.

In the alternative, and when the restricted device 106 is available, the media routing system 102 can reserve a line for the call at block 310 to insure that the call can be completed. In one embodiment, the line can be busy and still be reserved when call waiting is supported. Known to those skilled in the relevant art, policy settings based on system capabilities can be applied.

At block 312, the media routing system 102 can provide information about the calling device 104 to the authorizing device 108. The user of the authorizing device 108 can use the information to determine the identity of the calling device 104. In the illustration provided above, for example, the extension 1111 for the calling device 104 can be provided to the authorizing device 108. In one embodiment, the authorizing device 108 can display the number of the calling device 104 to the user. The media routing system 102 can also determine the name or other identification of the user of the calling device 104 and provide it to the authorizing device 108. The authorizing device 108 can be alerted and then display the caller information. In one embodiment, unique rings or other indications to denote the call for a restricted device 106 can be made.

Upon recognition of a call to the restricted device 106, the authorizing device 108 can provide at least one or more of the following options: intercept, approve, block, or forward.

Those skilled in the relevant art will appreciate that other options can be provided to the authorizing device 108 and are not limited to only those presented above. As described earlier, the authorizing device 108 can include a display that shows running applications. The applications can provide menus allowing option selections from a user.

When the call is intercepted, the authorizing device 108 picks up the call and the user of the authorizing device 108 speaks with the caller. In the approve option, the authorizing device 108 can signal the media routing system 102 to allow the call to proceed to the restricted device 106. The call, having been authorized, can be passed to the media routing system 102. Known to those skilled in the relevant art, in one embodiment, a check on the media routing system 102 can be used for loop avoidance. The restricted device 106 can thereafter be alerted with the caller information shown. If call waiting is supported and the restricted device 106 is in use, the call wait handling is invoked. As with standard calls, the call can be answered or go to voice mail, if available, after the ring timer expires.

In the block option, the call can be rejected by the authorizing device 108. This feature can be configured to redirect calls directly to the voicemail of the restricted device 106 or drop the call altogether. The forward option can allow the call to be forwarded to another number. Generally, this can be useful in the case where the device 106 or directory number being restricted is used by a number of people that have alternate contacts, so the authorizing device 108 can immediately forward to one of the contacts if desired. Options provided on the menu can allow the user of the authorizing device 108 to input which number to forward the call to.

In one embodiment, the user of the authorizing device 108 can pick up the call in the intercept option. When the user of the authorizing device 108 does not pick up the call, at block 314, the media routing system 102 can receive a selection from the authorizing device 108. These options can include approve, block and forward. The selected option is then applied by the media routing system 102 at block 316, which will be described in more details below. The line to the restricted device can be released at block 318 and the processes can end at block 320.

Figure 3B:
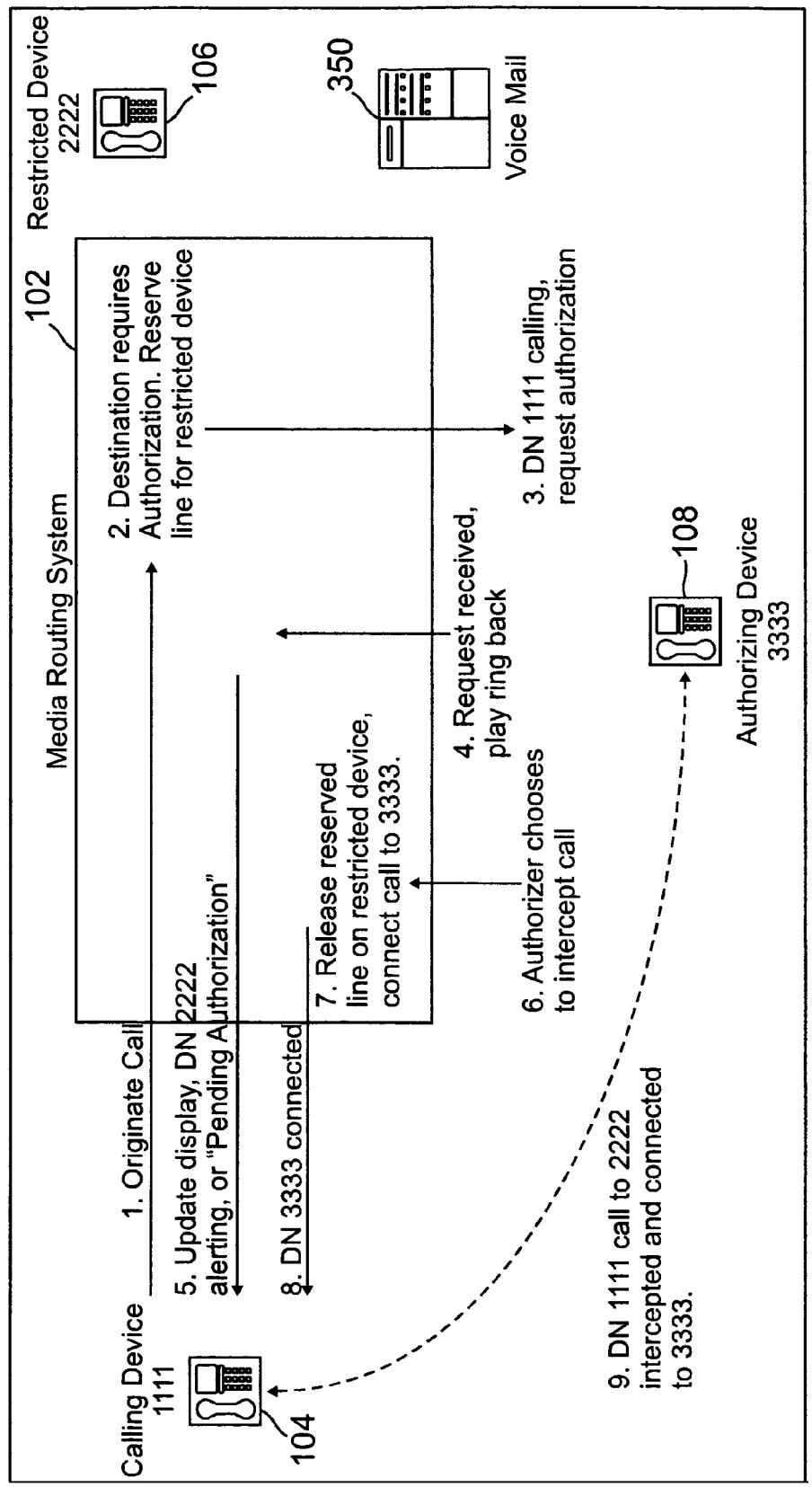

Beforehand, processes for call handling features were discussed. In particular, the four options of intercept, approve, block, and forward were provided. Referring now to FIG. 3B, a block diagram for showing call handling procedures to intercept a call by the authorizing device 108 in more detail is shown. The processes described herein are exemplary and should not be construed as limiting to the present application. While numbers providing steps are shown, these represent illustrative processes and should not be construed as providing any order.

Initially, the calling device 104 can originate the call and provide it to the media routing system 102 wherein the media routing system 102 can determine that the destination requires authorization from the authorizing device 108. The media routing system 102 can be setup to recognize that the extension 2222 of the restricted device 106 requires authorization beforehand. The media routing system 102 can also determine whether the calling device 104 has been preauthorized for automatically being connected. In one embodiment, a restricted list that provides automatic blocking of calls can also be used. When automatically blocked, the call can be dropped or provided to voicemail 350.

The media routing system 102 can reserve a line to the restricted device 106. This ensures that a future call can be made depending on the authorizing device 108. The media routing system 102 can provide a message to the authorizing device 108 that the call has been received and a call request authorization has been made. The media routing system 102 can also provide information about the calling device 104 such as the extension 1111.

In one embodiment, the media routing system 102 can determine whether the authorizing device 108 is available. If the authorizing device 108 is not available, the media routing system 102 can implement default procedures such as directly connecting the calling device 104 with the restricted device 106. In one embodiment, the authorizing device 108 can send the call to voicemail 350.

When the authorizing device 108 is able to receive the request for authorization, a message or ring back tone can be provided back to the calling device 104. In one embodiment, an update display can be provided on the calling device 104 showing that the call is pending authorization. In accordance with FIG. 3B, the user of the authorizing device 108 can choose to intercept the call. When intercepted, the media routing system 102 can release the reserved line on the restricted device 106 and connect the incoming call to the authorizing device 108 at extension 3333.

Figure 3C:
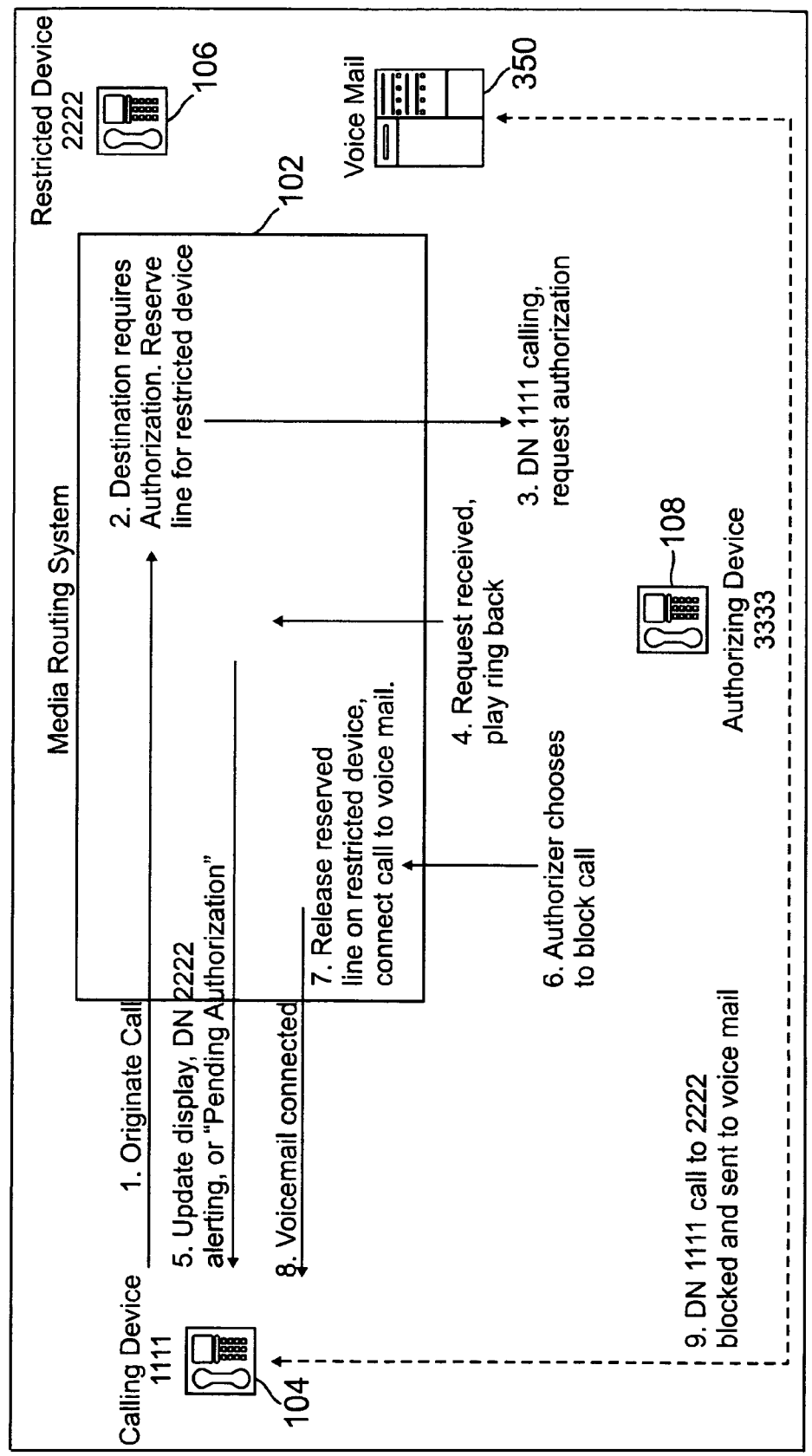

Turning to FIG. 3C, a diagram for showing call handling procedures to block a call by the authorizing device 108 in more details is shown. The call can originate from the calling device 104 and be intended for the restricted device 106. At the media routing system 102, the call can be designated to require authorization. Thereafter, a line can be reserved for the restricted device 106. The media routing system 102 can notify the authorizing device 108 that the calling device 104 intends to call the restricted device 106. A playback ring can be provided to the calling device 104. In the embodiment shown in FIG. 3C, the authorizing device 108 can block the call. When the call is blocked, the call from the calling device 104 can be provided to voicemail 350. The voicemail 350 can then be connected with the calling device 104. In one embodiment, the call to the restricted device 106, when blocked, can be dropped.

Figure 3D:
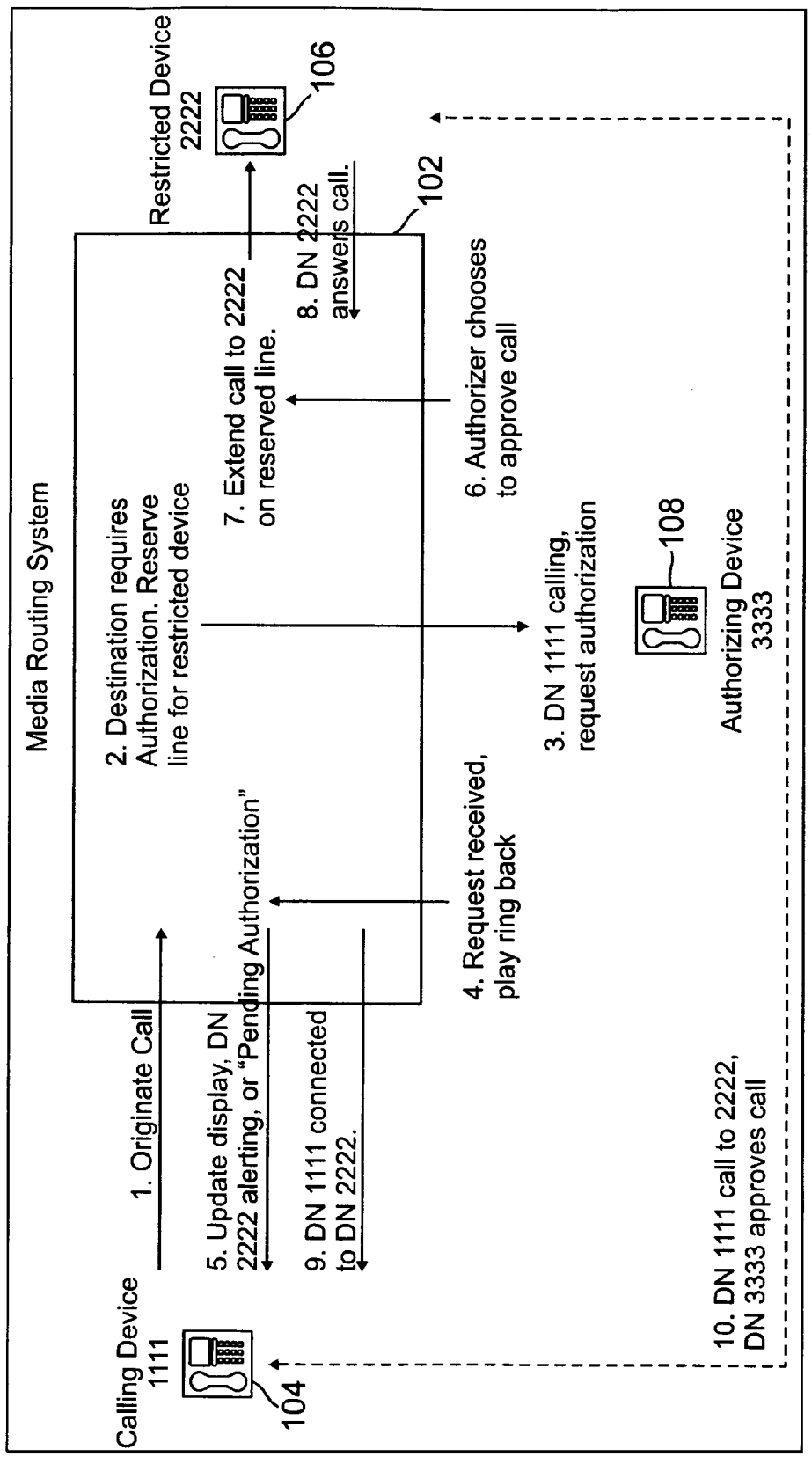

Referring now to FIG. 3D, a block diagram for showing call handling procedures to approve a call by the authorizing device 108 in more detail is shown. The call can originate from the calling device 104 and be intended for the restricted device 106. At the media routing system 102, the call can be shown to require authorization from the authorizing device 108. In turn, a line to the restricted device 106 can be reserved. The media routing system 102 can notify the authorizing device 108 that the calling device 104 is intending to connect with the restricted device 106. A playback ring is then provided to the calling device 104. In the configuration shown within FIG. 3D, the authorizing device 108 can approve the call. The call from the calling device 104 can then be connected with the restricted device 106 having extension 2222 over the reserved line.

While in the previous illustrations the authorizing device 108 filtered incoming calls to the restricted device 106, outgoing calls can also be monitored. The outgoing calls made by the restricted device 106 can be intercepted, approved, blocked, or forwarded by the authorizing device 108. When the restricted device 106 makes a call to the calling device 104, the call can be intercepted by the media routing system 102 and the authorizing device 108 is alerted. The authorizing device 108 can then implement one of the options provided above.

In other embodiments of the present application, the system 102 can apply to other forms of communications. For example, the authorizing device 108 can be used for controlling television viewings either on the Internet or a cable network. When a channel is selected, the information can be sent to the authorizing device 108, whereby a user of the authorizing device 108 can chose to accept the channel, reject it, or forward it.

In one embodiment, the general issue of real time control for media connections, whether a phone call, a TV channel, or a website is solved using the media routing system 102. The system 102 can also be used as a parental control. When a specific TV channel is selected, the authorizing device 108 can be notified, and can reject or approve the channel. Regardless of data or voice, the media routing system 102 can treat communications as IP traffic. Access can be granted or denied at the application layer. Applications can be layered on top of the feature to provide a pre-determined authorized caller list such that calls are automatically approved if the caller appears in the list. Likewise, restricted devices 104 can also be dropped or routed to voicemail 350.

A watch can be placed to detect a calling device 104 of importance and provide a distinct ring type on the authorizing device 108. Calls to the authorizing device 108 that require authorization can also alert differently such that the user of the authorizing device 108 knows it is not a personal call to their number, for example, extension 3333, but rather a call to another number that requires authorization.

In accordance with one aspect of the present application, a call processing method is provided. The method can include receiving a call from a calling device intended for a restricted device. In addition, the method can include calling an authorizing device regarding the call from the calling device and receiving a call handling selection from the authorizing device including blocking, authorizing, answering and redirecting the call. The method can also include applying the call handling selection from the authorizing device including prohibiting the call from the calling device when blocked, connecting the calling device with the restricted device when authorized, connecting the calling device with the authorizing device when answered, and connecting the calling device with a third device when redirected.

In one embodiment, the method can include activating the authorizing device to provide the call handling selections. In one embodiment, activating the authorizing device can include receiving a feature access code from the restricted device with a number of the authorizing device. In one embodiment, activating the authorizing device can further include calling the authorizing device and receiving a pin number from the authorizing device.

In one embodiment, activating the authorizing device can include receiving a feature access code from the authorizing device with a number of the restricted device. In one embodiment, the method can further include determining whether the authorizing device has appropriate permissions to authorize calls to the restricted device. In one embodiment, the method can further include providing a message to the calling device that the call is waiting for authorization.

In one embodiment, the method can include determining whether the authorizing device is busy. In one embodiment, the method can include enabling a default policy when the authorizing device is busy. In one embodiment, the default policy can be connecting the calling device with the restricted device through the line. In one embodiment, the third device can be a voicemail, email program, or apparatus.

In one embodiment, the method can include providing a busy signal to the calling device when the restricted device is unavailable. In one embodiment, the restricted device can be unavailable when no lines to the restricted device are open. In one embodiment, the call handling selection provided by the authorizing device can be based on information about the calling device.

In accordance with another aspect of the present application, a system is provided. The system can include a media router for routing a call from a calling device. The media router can connect the call to a restricted device when the calling device has pre-existing authorization otherwise can provide the call to an authorizing device. The authorizing device can answer the call or direct the media router to block the call, connect the call with the restricted device, or forward the call to a third device.

In one embodiment, the media router can prohibit the call when the calling device has been restricted. In one embodiment, the media router can determine whether the restricted device is available. In one embodiment, call waiting is supported by the media router.

In accordance with yet another aspect of the present application, a communication device coupled to a network router is provided. The communication device can include at least one processor and a memory operatively coupled to the processor, the memory storing program instructions that when executed by the processor, causes the processor to perform processes. The processes can include receiving a communication request by a calling device from the network router. In addition, the processes can include displaying information about the calling device and call handling selections for the communication request. The processes can also include receiving user input associated with the call handling selections. The processes can include providing the input to the network router for blocking, authorizing, answering or redirecting the communication request.

In one embodiment, the communication request can include a phone call, television program, text, or website.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A call processing method comprising:
   receiving a call from a calling device intended for a restricted device;
   calling an authorizing device regarding said call from said calling device, wherein said authorizing device is external to said calling device;
   receiving a call handling selection from said authorizing device comprising user input in response to said authorizing device being called by said calling device for at least one of blocking, authorizing, answering and redirecting said call; and
   applying said call handling selection from said authorizing device comprising at least one of prohibiting said call from said calling device when blocked, connecting said calling device with said restricted device when authorized, connecting said calling device with said authorizing device when answered, and connecting said calling device with a third device when redirected, further comprising providing a busy signal to said calling device when said restricted device is unavailable.

2. The call processing method of claim 1, wherein said restricted device is unavailable when no lines to said restricted device are open.

3. The call processing method of claim 1, wherein said call handling selection provided by said authorizing device is based on information about said calling device.

4. A communication device coupled to a network router comprising:
   at least one processor;
   a memory operatively coupled to said processor, said memory storing program instructions that when executed by said processor, causes said processor to:
      receive a communication request by a calling device to a restricted device from said network router, wherein the communication device is external to said calling device;
      display information about said calling device, said restricted device, and call handling selections for said communication request;
      receive user input associated with said call handling selections in response to said information about said calling device being displayed;
      provide said input to said network router for blocking, authorizing, answering or redirecting said communication request; and
      provide a busy signal to said calling device when said restricted device is unavailable.

5. The communication device of claim 4, wherein said communication request comprises at least one of a phone call, television program, and website.

6. The call processing method of claim 1, further comprising activating said authorizing device to provide said call handling selections.

7. The call processing method of claim 6, wherein activating said authorizing device comprises receiving a feature access code from said restricted device with a number of said authorizing device.

8. The call processing method of claim 7, wherein activating said authorizing device further comprises calling said authorizing device and receiving a pin number from said authorizing device.

9. The call processing method of claim 6, wherein activating said authorizing device comprises receiving a feature access code from said authorizing device with a number of said restricted device.

10. The call processing method of claim 9, further comprises determining whether said authorizing device has appropriate permissions to authorize calls to said restricted device.

11. The call processing method of claim 1, further comprising providing a message to said calling device that said call is waiting for authorization.

12. The call processing method of claim 1, further comprising determining whether said authorizing device is busy.

13. The call processing method of claim 12, further comprising enabling a default policy when said authorizing device is busy.

14. The call processing method of claim 12, wherein said default policy is connecting said calling device with said restricted device through said line.

15. The call processing method of claim 1, wherein said third device is at least one of a voicemail, email program, and apparatus.

\* \* \* \* \*